J. B. FORET.
AUTOMOBILE FENDER.
APPLICATION FILED SEPT. 25, 1913.
1,092,033. Patented Mar. 31, 1914.
2 SHEETS—SHEET 1.
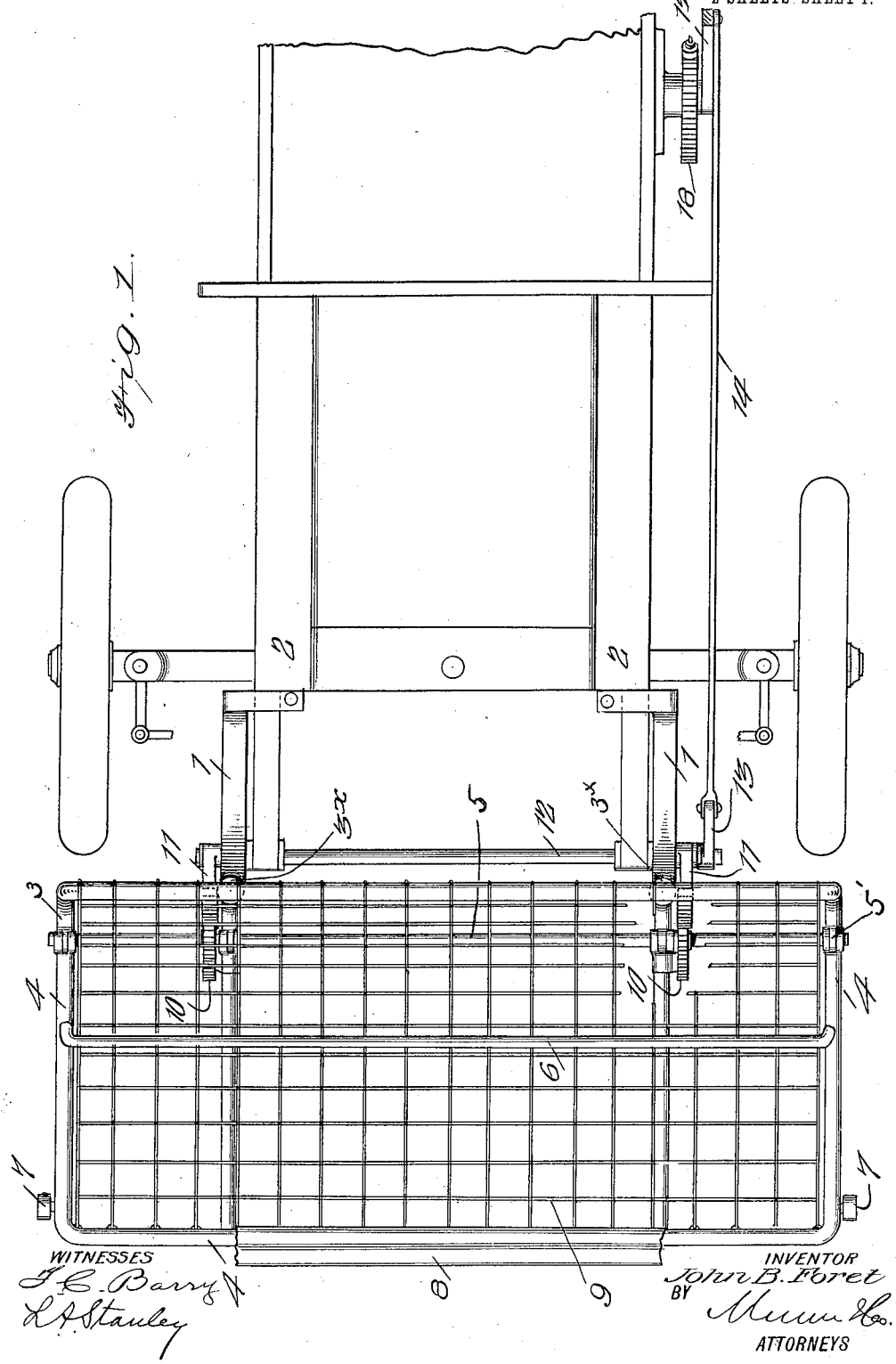
WITNESSES
J. C. Barry
L. A. Stanley
INVENTOR
John B. Foret
BY
Munn & Co.
ATTORNEYS J. B. FORET.
AUTOMOBILE FENDER.
APPLICATION FILED SEPT. 25, 1913.
1,092,033.
Patented Mar. 31, 1914.
2 SHEETS—SHEET 2.
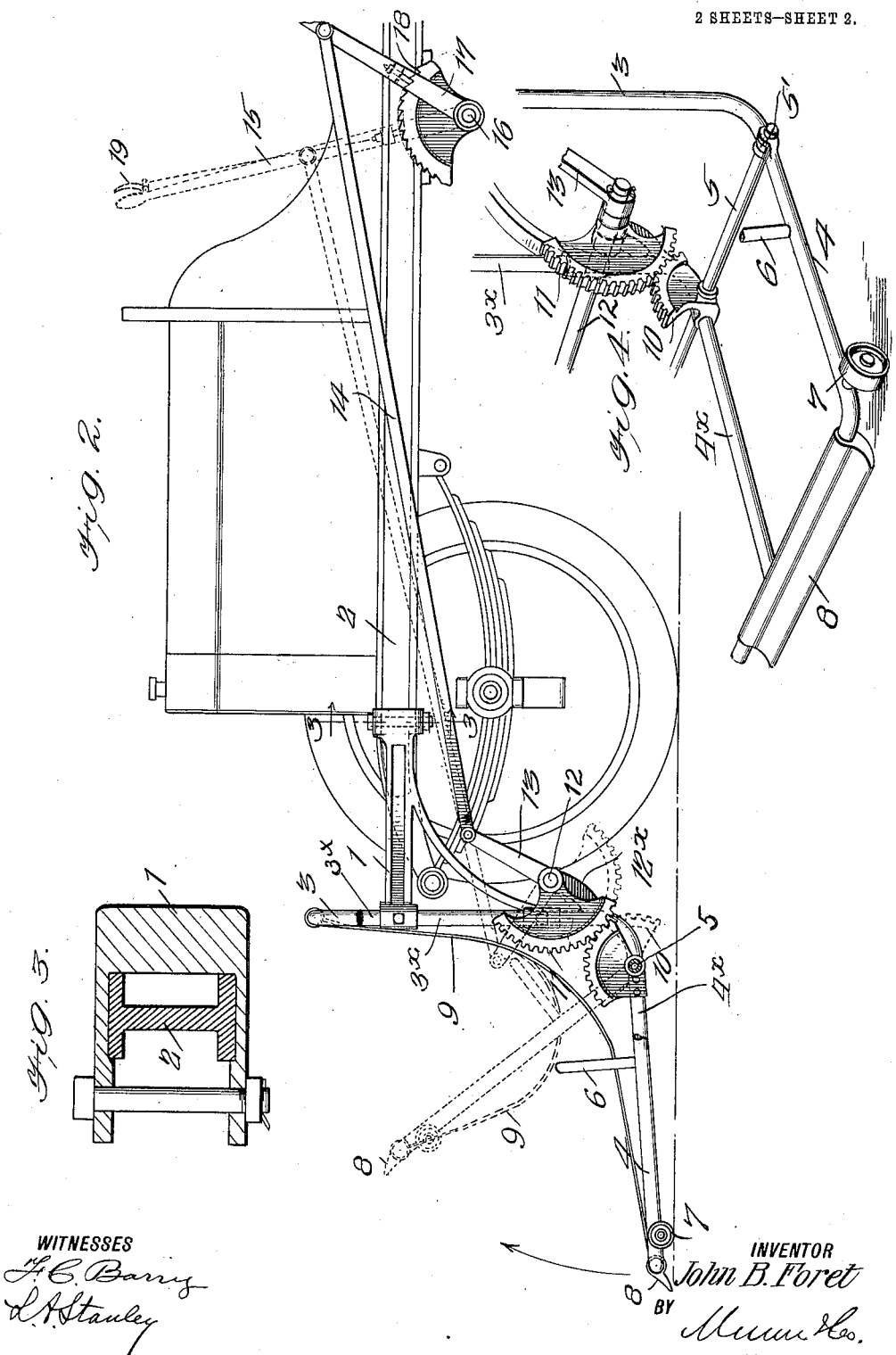

UNITED STATES PATENT OFFICE.

JOHN B. FORET, OF FORD CITY, MICHIGAN.

AUTOMOBILE-FENDER.

1,092,033.   Specification of Letters Patent.   Patented Mar. 31, 1914.

Application filed September 25, 1913. Serial No. 791,765.

*To all whom it may concern:*

Be it known that I, JOHN B. FORET, a citizen of the United States, and a resident of Ford City, in the county of Wayne and State of Michigan, have made certain new and useful Improvements in Automobile-Fenders, of which the following is a specification.

My invention relates to improvements in automobile fenders, and it consists in the combinations, constructions, and arrangements herein described and claimed.

An object of my invention is to provide a device by means of which a person who happens to be in front of an automobile may be prevented from suffering injury by the vehicle.

A further object of my invention is to provide a fender having a grab rail, which may be seized and which tends to cause the lifting of the outer portion of the fender, thereby removing the person's clothing from the ground and preventing it being caught between the fender and the ground.

A further object of my invention is to provide a device which may be folded when not in use, but which may be let down by the driver of the vehicle in times of danger.

A further object of my invention is to provide a simple device of the type described which is cheap to manufacture.

Other objects and advantages will appear in the following specification and the novel features of the device will be particularly pointed out in the appended claims.

My invention is illustrated in the accompanying drawings forming part of this application in which—

Figure 1 is a plan view of the device, Fig. 2 is a side view of the device, certain parts being shown in section and other parts being broken away, Fig. 3 is a section along the line 3—3 of Fig. 2, and Fig. 4 is a perspective view of certain of the working parts.

In carrying out my invention I provide the brackets 1 which may be attached to the frame 2 of an automobile, at the front end thereof. The brackets 1 carry the uprights 3ˣ of the fender frame, the latter having end uprights 3 as shown in the drawing. A U-shaped frame member 4 is hinged at 5′ to the bent end portions of the uprights 3, as shown in Fig. 4. At 6 I have shown a grab rail of substantially U-shape which is secured to the side arms 4 of the U-shaped portion of the fender frame. Rollers 7 may be carried by the front portion of the fender frame or not, as is found desirable, while a buffer 8 of rubber or other resilient material may also be used, or in certain instances the rubber buffer may be omitted. The basket proper is formed of wire netting 9 which is secured to the top cross member 3ˣ and to the front cross member of the U-shaped frame portion 4.

The means for lowering the fender consists of segmental gears 10 rigidly mounted on the pivot bar 5. These gears 10 are in mesh with segmental gears 11 mounted on a common rod 12 carried by brackets such as those shown at 12ˣ in Fig. 2 secured to the main brackets 3. One end of the bar 12 is provided with an arm 13 to which a link 14 is attached.

The link 14 is pivotally connected with an operating lever 15 which is pivoted at 16 on a bracket 17 which also bears a locking segment 18, the operating handle being provided with a locking member 19 arranged to coöperate with the locking segment 18.

From the foregoing description of the various parts of the device the operation thereof may be readily understood.

The normal position of the device is that shown in dotted lines in Fig. 2. In this position the fender is folded. If now the driver of the automobile sees that he cannot avoid hitting a person he grasps the lever 15 and pulls it suddenly backward. This movement, through the movement of the link 14, arm 13, and segmental gears 12 and 10, causes the downward movement of the outer end of the fender into the full line position shown in Fig. 2. Ordinarily when a fender strikes a person the latter is precipitated rearwardly onto the fender in the opposite direction from that in which the vehicle is going. In the present instance when the fender strikes the person and he is falling rearwardly he naturally reaches out to grasp something and instinctively takes hold of the grab rail 6. This movement tends to swing the outer end of the frame slightly upward, since the force exerted on the grab rail is toward the rear and above the pivotal point of the frame. The operator can swing the lever 15 forwardly, thus raising the fender into the dotted line position shown in Fig. 2, thereby forming a natural trough or basket in which the person is safely carried.

In many accidents where fenders are used the fender will operate all right, but the clothing of the person will be caught between the fender and the ground, thus dragging a person out of the fender. With this device the clothing is lifted from the ground and the person is deposited safely in the basket.

In order to permit the outer end of the fender to raise when one grasps the grab rail 6 the teeth of the locking segment 18 are made so that they will permit a folding movement of the fender, the locking tooth being beveled to ride over the teeth of the segment, thus the raising of the outer end of the fender will be permitted, while when the person is in the basket he will be held clear of the ground by the fact that the locking member on the lever prevents the return of the fender to its lowest position.

I claim:—

1. In a fender for automobiles, a pair of brackets, an upright fender frame portion carried by said brackets, a movable frame portion hinged to said upright frame portion, a grab rail carried by said movable frame portion, the upper part of said grab rail being above the hinge, a flexible support secured to the upper end of said upright frame portion and to the outer end of said movable frame portion, said flexible support passing underneath said grab rail, and means disposed near the driver's seat for swinging said movable frame portion into and out of a folded position.

2. In a fender for automobiles, a pair of brackets, an upright fender frame portion carried by said brackets, a movable frame portion hinged to said upright frame portion, a grab rail carried by said movable frame portion, the upper part of said grab rail being above the hinge, a flexible support secured to the upper end of said upright frame portion and to the outer end of said movable frame portion, means disposed near the driver's seat for swinging said movable frame portion into and out of a folded position, said means comprising meshing segmental gears, one of said gears being secured to said movable portion and the other being rotatably mounted on said upright frame portion, an arm connected with said last named segmental gear, an operating lever, and a link connecting said arm and said operating lever.

3. In a fender for automobiles, a pair of brackets, an upright fender frame portion carried by said brackets, a movable frame portion hinged to said upright frame portion, a grab rail carried by said movable frame portion, the upper part of said grab rail being above the hinge, a flexible support secured to the upper end of said upright frame portion and to the outer end of said movable frame portion, means disposed near the driver's seat for swinging said movable frame portion into and out of a folded position, said means comprising meshing segmental gears, one of said gears being secured to said movable portion and the other being rotatably mounted on said upright frame portion, an arm connected with said last named segmental gear, an operating lever, a link connecting said arm and said operating lever, and means for locking the fender in its folded position.

4. In a fender for automobiles, a pair of brackets, an upright fender frame portion carried by said brackets, a movable frame portion hinged to said upright frame portion, a U-shaped grab rail carried by said movable frame portion, the lower part of said grab rail being disposed adjacent to said hinge of said movable portion, and the upper portion of said grab rail being disposed above the hinged portion, whereby a thrust on the upper part of the grab rail will turn the frame on its hinge and raise the outer end of the latter above the ground, means for automatically locking the frame in its raised position, and a flexible support secured to the upper end of said upright frame portion and to the outer end of said movable frame portion, said flexible support passing underneath said grab rail.

JOHN B. FORET.

Witnesses:
 FRANCIS H. BURKE,
 EDWARD M. BURKE.

---

Copies of this patent may be obtained for five cents each, by addressing the "Commissioner of Patents, Washington, D. C."